United States Patent Office 2,790,154
Patented Apr. 23, 1957

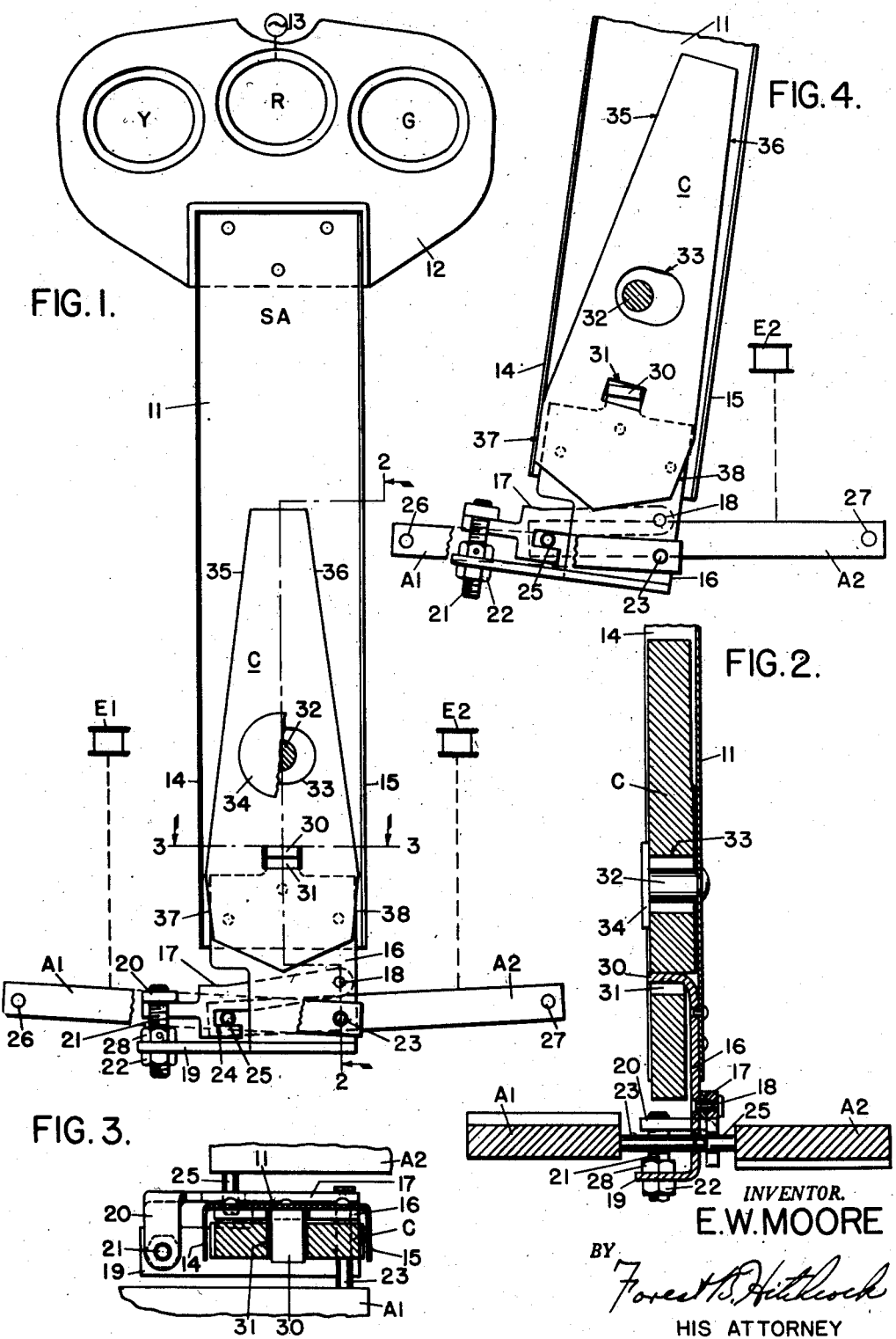
April 23, 1957  E. W. MOORE  2,790,154
SEARCHLIGHT SIGNALS
Filed Feb. 3, 1956
INVENTOR.
E. W. MOORE
HIS ATTORNEY

2,790,154

SEARCHLIGHT SIGNALS

Edmund W. Moore, Rochester, N. Y., assignor to General Railway Signal Company, Rochester, N. Y.

Application February 3, 1956, Serial No. 563,266

4 Claims. (Cl. 340—50)

This invention relates in general to searchlight type signals used for displaying distinctive signal indications in railway signaling systems.

Signals of this type usually comprise a movable spectacle arm provided with distinctive color roundels which are selectively interposed in the signal light beam; and, this invention more particularly relates to a means whereby damping action is provided for the spectacle arm to prevent overrun caused by bounding action when the spectacle arm is moved from one indicating position to another. Any substantial overrun of the spectacle arm is very objectionable since a false color indication will be momentarily displayed before the spectacle arm can return to the position to which it is being operated.

The spectacle arm operating mechanism to which the applicant's invention is applicable, includes two electroresponsive tractive type armatures. The normal position of the spectacle arm and operating mechanism is the deenergized position of the armatures wherein the spectacle arm rests in a central position to which it is biased by gravity. For safety reasons, this position is chosen as the stop indicating position. The energization of one electroresponsive device will cause the spectacle arm to move to one extreme position where a caution indication is displayed; whereas, the energization of the other electroresponsive device will cause the spectacle arm to move to its other extreme position where a clear or proceed indication is displayed. The structure is such that only one armature is picked up at any given time.

In the particular embodiment of the invention herein disclosed, a counterweight is movably mounted within the confines of the spectacle arm at a location near and directly above the spectacle arm pivot means. The counterweight is specially shaped and pivotally mounted on a bracket support in a manner so that the greater part of its weight is distributed above such bracket support. In operation, when the spectacle arm is moved in a given direction from its central position to another indicating position, the counterweight of course moves with the spectacle arm and also tilts from its normal position on the supporting bracket in an arcuate manner and in the same given direction as the spectacle arm.

This extra movement of the counterweight tends to dampen any rebound of the spectacle arm at this time, and also places the counterweight in a position wherein it becomes effective upon the return movement of the spectacle arm to its normal central position to provide further damping action.

Upon being returned to its normally deenergized central position, the spectacle arm has a tendency to slightly overrun due to its momentum, but such movement is opposed by the armatures to which it is attached. Since the counterweight is in its previously tilted position until the spectacle arm has reversed its direction from the slight overrun, there is a minimum of momentum for the armatures to absorb in stopping the movement of the spectacle and keeping the overrun slight; but the counterweight again tilts when the spectacle reverses its direction after slightly overrunning the central position, so that there are opposing forces in the spectacle and the counterweight which cancel each other to quickly bring the spectacle to rest in its central position.

In effect, the spectacle arm has characteristics of an inverted pendulum upon which is mounted another inverted pendulum. These two inverted pendulums have different natural periods so that they operate under certain circumstances out of phase with each other in a manner to reduce the overrun and rebound of the spectacle arm.

The primary object of the present invention can thus be said to be the provision of a suitable damping means for the spectacle arm of a light signal which comprises a specially proportioned counterweight coacting with the spectacle arm in a manner whereby the weight distribution of the counterweight with respect to its point of mounting on the spectacle arm is effective to minimize the overrun movement of the spectacle arm during its movement from one indicating position to another.

Other objects, purposes and characteristic features of the present invention and the operation thereof will be more apparent from the following detailed description of the specification when considered in connection with the accompanying drawings in which:

Fig. 1 is a front view of a device incorporating the present invention shown somewhat diagrammatically and shows the spectacle arm with its counterweight and a mounting and operating means therefor;

Fig. 2 is a sectional side elevation view of the device incorporating the present invention taken substantially on the line 2—2 of Fig. 1 as viewed in the direction of the arrows;

Fig. 3 is a partial sectional top view of the device incorporating the present invention taken substantially on the line 3—3 of Fig. 1 as viewed in the direction of the arrows; and Fig. 4 is a partial front view of the device incorporating the present invention showing the position of the apparatus after operation from its normal center indication position to one of its extreme indication positions, such as for example, the yellow caution indication position as chosen.

The drawings are partially diagrammatic and have been shown as such more for the purpose of illustrating the applicant's invention as applied to a well known type of searchlight signal. Such a signal construction and operating means with the exception of a few variations has been shown and described in detail in the pending application of Ralph W. Hewes, Serial No. 413,527, filed March 2, 1954, now U. S. Patent 2,750,577 granted June 12, 1956, and if necessary, reference may be made to such pending application for a more complete understanding of the construction and mode of operation. This invention may be considered in the nature of an improvement in the movable spectacle arm damping means disclosed and claimed in said pending application and it is believed a brief description herein of the operating characteristics and assembly of such a searchlight signal mechanism will suffice, more devoted attention being given to the applicant's improvements.

Referring now more particularly to Figs. 1, 2 and 3 of the drawings, there has been shown a spectacle arm SA which comprises an arm 11 to which is suitably attached at its upper end a spectacle 12. The spectacle 12 is provided with the usual color glasses designated Y, R and G to indicate the colors used, namely, yellow, red and green, these color glasses being suitably spaced and mounted to cooperate one at a time with a light beam source 13 when the spectacle arm SA is positioned in a particular one of its three positions, as explained hereinafter. The arm 11 is channel shaped in cross section which provides two side walls 14 and 15.

Attached to the bottom end of the arm 11 by rivets or the like is an articulated bracket, this bracket having two members 16 and 17 which are pinned together at one side by a pin 18 to form a hinge connection. The other side of the bracket member 16 is provided with a projecting arm 19 while the other side of the bracket member 17 is provided with a projecting arm 20. The ends of these projecting arms 19 and 20 are connected together by a stud bolt 21 and nut 22 in a manner to provide an adjustable connection whereby the distance between the arms 19 and 20 may be varied, for reasons explained hereinafter. The bracket member 16 is provided with a hole to constitute a bearing in which a pivot pin 23 is journaled. Likewise, the bracket member 17 is provided with a rectangular slot 24 which acts as a bearing in which a pivot pin 25 is journaled.

The pivot pins 23 and 25 are carried by a pair of armatures A1 and A2 which form a part of electroresponsive devices which have been illustrated rather diagrammatically for convenience and have been designated E1 and E2. These electroresponsive devices E1 and E2 may be of any well known construction, as for example the same as shown and described in the above referred to Patent No. 2,750,577, and usually comprise a magnetic core structure and an associated coil which when energized will attract an associated pivoted armature, thus causing a movement of the free end of the armature to a set operated position. In the illustration shown on the drawings in connection with this invention, these electroresponsive devices E1 and E2 have been shown one on either side of the spectacle arm SA and are positioned so that their respective armatures A1 and A2 lie in a substantially horizontal plane and have their free ends which carry the pivot pins 23 and 24 so located that they cooperated with the bearings located in the bracket members 16 and 17.

The electroresponsive device E1 has its armature suitably pivoted such as by a pin 26. Being normally deenergized, it is gravity biased downward against a suitable stop limitation (not shown). Its free end which carries the pivot pin 23 is journaled in the bracket member 16. Likewise, the electroresponsive device E2 has its armature pivoted on a pin 27 and its free end which carries the pivot pin 25 is journaled in the bracket member 17. It should now be understood that the pivot pins 23 and 25 form the sole support and mounting means for the spectacle arm SA, the armatures A1 and A2 carrying the weight of the complete assembly. It should also be understood that the pivot pins 23 and 25 alternately act as pivots for the spectacle arm SA during its movement depending on the direction of rotation of the spectacle arm SA. For example, energization of the electroresponsive device E1 will cause its armature A1 to pick up which will move the pivot pin 23 upward, causing the spectacle arm SA to rotate counterclockwise around the then stationary pivot pin 25. Likewise, an upward movement of the armature A2 and its associated pivot pin 25 will cause the spectacle arm SA to rotate clockwise around the pivot pin 23.

As previously mentioned, adjustment means is provided between the two bearing bracket members 16 and 17. This is necessary in order to obtain the proper alignment between the color discs Y, R and G and the light beam source 13, as well as insuring that the spectacle arm SA is balanced in a vertical position when in its center neutral position as shown in Fig. 1. In order to adjust the position of the spectacle arm SA, the lock nut 22 must be backed off after which the adjusting screw 21 may be turned in the desired direction. As the adjusting screw 21 is threaded into the extending arm 20, the distance between the shoulder 28 on adjusting screw 21 and the extending arm 20 may be varied, after which the adjusting means is securely locked in place again by tightening the nut 22. Thus, it is obvious that the spectacle arm may be slightly rotated either clockwise or counterclockwise on its pivot pin 23 merely by raising or lowering the position of the extending arm 19 of the bracket member 16 until the desired vertical position is obtained. The slotted bearing arrangement 24 is provided in the bearing bracket member 17 to permit horizontal movement of the pivot pin 25 and prevent binding as a vertical movement of the pivot pin 25 during operation must of necessity be in the form of an arc. Also, slight tolerances must be permitted during assembly as the location of the armature pivot pins 26 and 27 with respect to each other will determine the exact distance between the pivot pins 23 and 25 which are carried in the free ends of these armatures A1 and A2.

Referring now more particularly to the counterweight damping means for the spectacle arm SA, the counterweight C consists of a heavy mass of metal which is pivotally mounted on and within the confines of the spectacle arm SA in such a manner that its weight, shape and movements cooperate with the movements of the spectacle arm to give the desired damping action, as will be explained hereinafter.

As previously mentioned, the arm portion 11 of the spectacle arm SA is channel shaped in cross section, presenting two side plates 14 and 15. The thickness of the counterweight C is slightly less than the width of these side plates 14 and 15 so that the counterweight C lies completely within the channel section when mounted. The bracket member 16 which is fastened to the inside face of the arm 11 is provided with an extending arm 30 which is bent at right angles to the inside face of the arm 11 so that it projects in a horizontal plane a distance equal to the width of the side plates 14 and 15. The top surface of extending arm 30 is perfectly smooth and level and forms the support for the counterweight C. The counterweight C is provided with a rectangular shaped opening 31 which has its top side machined perfectly smooth and level. By placing the counterweight C on the extending arm 30 with the extending arm 30 lying within the opening 31, the counterweight is mounted on a flat surface in an upright balanced position on the spectacle arm SA. The counterweight C is loosely retained in this position by means of a stud 32 which passes through an elongated hole 33 in the counterweight C. The stud 32 has an enlarged head 34 at its outer end and is riveted to the the back wall of the arm 11 at its other end, the enlarged head 34 limiting the outward movement of the counterweight C.

The location of the opening 31 in the counterweight C and the location of the extending arm 30 with respect to the spectacle arm SA is such that the counterweight is mounted on the spectacle arm SA in a position dead center and slightly above the spectacle arm pivot pins 23 and 25, the greater portion of the counterweight mass lying above the opening 31 and the counterweight supporting arm 30. This distribution of weight is such that a certain degree of arcuate movement of the supporting arm 30 in either direction from dead center will cause the counterweight to tilt off center on its supporting arm 30. However, under certain conditions where the arcuate movement of the supporting arm 30 is less than that required to tilt the counterweight C, the counterweight will remain seated on the flat surface of its supporting arm 30, the distribution of weight being such that the gravity bias of the counterweight C is still downward.

Referring now to the shape and formation of the counterweight C in relation to its mounted position within the limits of the two side walls 14 and 15 of the arm portion 11 of the spectacle arm SA, it can be seen that the sides of the counterweight C are tapered inward both top and bottom from a certain point which lies approximately in the same horizontal plane as the supporting arm 30 and the opening 31. In this connection, the angle of taper on the upper sides 35 and 36 of the counterweight C is greater than the angle of taper on the lower sides 37 and 38. This forming of the counterweight C is necessary as it is important that when a tilting movement of the counterweight C occurs, one of the bottom sides 37 or 38 must strike one of the spectacle arm side walls 14 or 15, the upper sides 35 and 36 of the counterweight C staying clear of the spectacle arm side walls 14 and 15, as will be explained hereinafter.

With reference to Fig. 1, the counterweight C is so proportioned that its arcuate movement within the limits of the spectacle arm side walls 14 and 15 is limited to approximately 6 degrees. This amount of movement is insufficient to disturb the gravity bias of the counterweight C and it will always return to its upright dead center position provided its supporting arm 30 is on a level horizontal plane. With reference to an operated position of the spectacle arm SA as shown in Fig. 4, the device is so proportioned that the spectacle arm SA has moved approximately 9 degrees in a clockwise arcuate path in order to place the yellow indication Y in the beam of the light source 13, a new indication position having been obtained. This 9 degrees of arcuate movement of the spectacle arm SA has been sufficient to upset the gravity bias of the counterweight C and it will tilt an additional 6 degrees on its supporting arm 30 in a clockwise direction until its bottom side 37 comes to rest against the bottom side of the spectacle arm side wall 14. In other words, it takes an arcuate movement of between 6 and 9 degrees to upset the gravity bias of the counterweight C and cause it to tilt.

Referring now to the operating characteristics of the organization just described, let us assume first that the spectacle arm is to be moved from its normal red danger position to the yellow caution position. With reference to Figs. 1 and 4 it can be seen that when the electroresponsive device E2 is energized, armature A2 will be picked up causing the armature pin 25 to move upward. The spectacle arm SA will pivot on the armature pin 23 and rotate in a clockwise direction until the yellow indication Y is in the path of the light source 13. As the spectacle arm assumes its yellow indication position, the counterweight C will tilt off balance on its supporting arm 30 still further in a clockwise direction until the lower left hand side 37 of the counterweight C bears against the lower left hand side 14 of the spectacle arm SA, the various parts assuming their positions as shown in Fig. 4. The spectacle arm SA and the counterweight C will remain in this position as long as the electroresponsive device E2 is energized, the counterweight having part of its weight biased in the direction of rotation and tending to hold the spectacle arm in its operated position.

Assuming next that the spectacle arm SA is to be moved to the green indication position G, energy will be reversed so that the electroresponsive device E2 will drop its armature A2 and the electroresponsive device E1 will pick up its armature A1. As the armature A2 drops, its armature pin 25 will move downward allowing the spectacle arm SA to rotate counterclockwise and return to its central position. Also, as the armature A1 picks up, its armature pin 23 will move upward. This causes the spectacle arm SA to pivot on the armature pin 25 and continue to rotate in a counterclockwise direction until the green indication G is in the path of the light source 13. During the movement of the spectacle arm SA as just described, the counterweight C will first return to its central upright position and then tilt in a counterclockwise position until the lower right-hand side 38 of the counterweight C bears against the lower right-hand side 15 of the spectacle arm SA. Thus, the various parts will assume a position directly opposite to that shown in Fig. 4 which illustrates the yellow indication position.

When it is desired to return the spectacle arm SA to its normal central-at-rest position from either one of its operated green or yellow indication positions, the then energized electro-responsive device is deenergized and its armature drops to normal. As an example for explanation, let us assume that the spectacle arm SA is in its operated yellow indication position as shown in Fig. 4.

Upon the dropping of the armature A2 the spectacle arm SA will rotate counterclockwise to its center position very rapidly due to the gravity bias of the armature mass to which it is attached. As this action occurs rather abruptly, the spectacle arm SA has a tendency to slightly overrun past center due to its momentum. However, such overrun movement will be opposed by the gravity bias of the other armature A1. Also, the momentum is minimized due to the fact that the counterweight C is still tilted on its supporting arm 30, its weight tending to oppose the counterclockwise movement of the spectacle arm SA until such time as the spectacle arm has reached its slight overrun position, whereupon the counterweight assumes a substantially vertical position, its gravity bias then being substantially downward. At this point of action, the overrun movement of the spectacle arm SA is stopped and the gravity bias of the armature A1 will return the spectacle arm SA to its center position, while the counterweight C will tend to tilt in a counterclockwise position. Instead of the counterweight C tilting in a counterclockwise direction, its supporting arm 30 will be moving in a clockwise direction, the net result being that the counterweight C will merely settle down in a substantially vertical position on its flat supporting arm 30 at the same time that the spectacle arm SA assumes a substantially vertical position. Any slight movements of the spectacle arm SA or counterweight C still existing are insignificant and the spectacle arm will quickly reach a final-at-rest upright position.

Having thus illustrated and described the main object of the present invention and the manner in which it performs, it should be understood that various adaptations and deviations in the structure could be made without departing from the spirit of the invention within the scope of the appending claims.

What I claim is:

1. A device comprising a movable vane member, means for pivotally supporting and operatively displacing said movable vane member, a horizontally disposed flat bracket member attached to said movable vane member directly above and near its said supporting means, a movable weight retained within the structure of said movable vane member, said movable weight having a squared aperture therethrough located directly below its center of mass, said flat bracket member extending through said squared aperture to form a flat bearing surface for said movable weight so that said movable weight is gravity biased to a normal upright position; whereby operational displacements of said movable vane member cause pivotal movements of said movable weight within the confines of said movable vane member, said pivotal movements changing the direction of bias of said movable weight which sets up certain forces which are used to dampen excess movements of said movable vane member.

2. A device comprising a movable vane member, means for pivotally supporting and operatively displacing said movable vane member, a movable weight having a squared aperture therethrough located below its center of mass, said movable weight being retained within the structure of said movable vane member, said squared aperture having a flat upper face disposed horizontally to the vertical center of gravity center line of said movable weight, a supporting arm attached to said movable vane member having a flat upper face disposed in the same plane as said flat upper face of said squared aperture, said supporting arm pivotally supporting said movable weight by having its said upper face engaging the said upper face of said squared aperture of said movable weight; whereby said movable vane member and said movable weight assume a normal gravity biased upright position when said supporting and operating means is deactivated, whereupon rotary operational displacements of said movable vane member cause rotary movements of said movable weight, said movable weight pivoting about said supporting arm to assume positions limited by the structure of said movable vane member.

3. A device comprising a movable vane member having positioned multiple color aspects, electroresponsive armature operating means for supporting and operatively rotating said movable vane member from its normal central position, said electroresponsive armature operating means being capable when activated of rotating said movable vane member through small angular displacements as determined by the distance between two of said color aspects and being capable of returning said movable vane member to its normal central position when deactivated, a supporting arm fastened to said movable vane member and having a flat upper face disposed at right angles to the vertical plane of said movable vane member, a movable weight having a squared aperture therethrough located below its center of mass, said squared aperture having a flat upper face disposed in the same plane as said flat face of said supporting arm, said movable weight being retained within the structure of said movable vane member and being supported by said supporting arm which passes through said squared aperture, said flat face of said aperture bearing on said flat face of said supporting arm under normal gravity biased conditions, said weight being free to tilt upon said supporting arm to positions limited by the structure of said movable vane member, whenever displacements of said movable vane member from a center color aspect position to an extreme color aspect position occur, said movable weight in conjunction with the weight of said armatures of said electroresponsive operating means acting to gravity bias said movable vane member to its said normal central position upon return of said movable vane member to its said center color aspect position.

4. A multiple color aspect light signal device comprising, a first armature member and a second armature member each being independently operable by a respective electroresponsive device, a movable vane member having an intermediate and two extreme positioned color aspects and being operatively connected by a first pin to said first armature member and by a second pin to said second armature member, said first and said second pins being journalled in said movable vane member and providing a support therefor, one of said pins being adjustably positioned with respect to the other of said pins, a supporting arm fastened to said movable vane member and having a flat upper face disposed at right angles to the vertical plane of said movable vane member, a movable weight having a squared aperture therethrough located below its center of mass, said squared aperture having a flat upper face disposed in the same plane as said flat face of said supporting arm, said movable weight being retained within the structure of said movable vane member and being supported by said supporting arm which passes through said squared aperture, said flat face of said aperture bearing on said flat face of said supporting arm under normal gravity biased conditions, said weight being free to tilt upon said supporting arm to positions limited by the structure of said movable vane member; whereby movements of said first and said second armature members caused by energization of said electroresponsive devices are transmitted to said movable vane member by said first and said second pins respectively which act to displace and pivotally rotate said movable vane member and cause a change in the display of said color aspects from an intermediate to an extreme indication position, such displacements of said movable vane member causing said movable weight to tilt upon said supporting arm and further rotate until limited by the confines of said movable vane member, whereupon deenergization of said electroresponsive devices will permit said movable vane member to return to its substantial normal vertical position, wherein the reactionary movements of said movable weight in conjunction with the weight of said armatures quickly act to gravity bias said movable vane member back to a normal dormant position.

No references cited.